United States Patent
Acker et al.

(10) Patent No.: US 6,435,531 B1
(45) Date of Patent: Aug. 20, 2002

(54) STABILIZER ARRANGEMENT FOR A MOTOR VEHICLE AND METHOD OF MAKING SAME

(75) Inventors: Bernd Acker, Esslingen; Werner Busch, Weinstadt; Rudlf Reinhardt, Esslisngen; Thomas Szell, Altdorf, all of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/609,760

(22) Filed: Jul. 3, 2000

(30) Foreign Application Priority Data

Jul. 2, 1999 (DE) .......................................... 199 30 444

(51) Int. Cl.⁷ ........................................... B60G 21/055
(52) U.S. Cl. .............................. 280/124.107; 280/5.506
(58) Field of Search ................... 280/124.106, 124.107, 280/5.506, 124.1

(56) References Cited

U.S. PATENT DOCUMENTS

| | | | |
|---|---|---|---|
| 3,197,233 A | * 7/1965 | Van Winsen | |
| 3,391,722 A | 7/1968 | Ligh | |
| 4,919,444 A | 4/1990 | Leiber et al. | |
| 5,527,061 A | * 6/1996 | Karl | 280/723 |
| 5,580,079 A | * 12/1996 | Pradel et al. | 280/723 |
| 5,632,502 A | * 5/1997 | Oppitz et al. | 280/689 |
| 5,700,027 A | * 12/1997 | Schiffler | 280/723 |

FOREIGN PATENT DOCUMENTS

| | | |
|---|---|---|
| DE | 1105290 | 10/1959 |
| DE | 2728306 | 1/1978 |
| DE | 3618139 | 12/1987 |
| DE | 3737735 | 6/1988 |
| DE | 3730334 | 3/1989 |
| DE | 3740244 | 4/1990 |
| DE | 4337771 | 5/1995 |
| DE | 4337813 | 5/1995 |
| DE | 29203814.4 | 7/1995 |
| DE | 4443809 | 4/1996 |
| DE | 4337771 | 6/1996 |
| DE | 4442223 | 9/1996 |
| DE | 4337813 | 5/1997 |
| DE | 19758292 | 11/1998 |
| EP | 428 439 | * 11/1990 |
| EP | 0920948 | 6/1999 |
| EP | 0949094 | 10/1999 |
| GB | 2309504 | 7/1997 |
| JP | 58034243 | 2/1983 |

* cited by examiner

Primary Examiner—Avraham Lerner
(74) Attorney, Agent, or Firm—Crowell & Moring LLP

(57) ABSTRACT

A stabilizer arrangement for a motor vehicle for coupling two wheels of a vehicle axle line includes a first stabilizer part assigned to one wheel and a second stabilizer part assigned to the other wheel. An actuator couples the stabilizer parts and makes possible a pretensioning of the stabilizer parts. The first stabilizer part is connected non-rotationally with a first actuator connection and the second stabilizer part is connected non-rotationally with a second actuator connection. In order to provide stabilizer arrangements which can be used within the scope of large-scale production, at least one of the stabilizer parts is connected either directly with the associated actuator connection by a self-welded connection, such as friction welded connection or a laser welded connection, or is connected indirectly with the associated actuator connection over a coupling element, connected non-rotationally with the stabilizer part.

11 Claims, 4 Drawing Sheets

STABILIZER ARRANGEMENT FOR A MOTOR VEHICLE AND METHOD OF MAKING SAME

BACKGROUND AND SUMMARY OF INVENTION

This application claims the priority of German patent document 199 30 444.0-21, filed Jul. 2, 1999, 1999, the disclosure of which is expressly incorporated by reference herein.

The invention relates to a stabilizer arrangement for a motor vehicle, especially a passenger car, for coupling two wheels of a vehicle axle line. Preferred embodiments of the invention relate to stabilizer arrangements with a first stabilizer part, assigned to one wheel and with a second stabilizer part, assigned to the other wheel, as well as with an actuator, which couples the stabilizer parts and makes possible a pretension of the stabilizer parts, the first stabilizer part being connected non-rotationally with a first actuator connection and the second stabilizer part being connected non-rotationally with a second actuator connection. The invention furthermore relates to a method for producing such a stabilizer arrangement.

As a rule, it is the function of a stabilizer to improve the rolling behavior of a vehicle. From the German patent document 11 05 290, a stabilizer arrangement of the above-mentioned type is known, which has a first stabilizer part, which is assigned to one wheel, as well as a second stabilizer part, which is assigned to the other wheel. An actuator or actor, constructed in the form of a rotor-stator aggregate, couples the two stabilizer parts, the first stabilizer part being connected non-rotationally with a first actuator connection, such as the rotor, and the second stabilizer part with a second actuator connection, such as the stator. By a controlled rotation between the rotor and the stator, a pretension of the stabilizer part can selectively be applied, as a result of which the roll stabilization of the vehicle can be achieved. Basically, with such a stabilizer arrangement, the pitch behavior of the vehicle can also be affected. Furthermore, such a stabilizer arrangement can also have the function of a level-adjusting device or of a jack.

In the case of the aforementioned stabilizer arrangement, the non-rotational connection between the actuator and the respective stabilizer part is accomplished in each case over a denticulation. In this connection, an outer denticulation, formed at the respective end of the stabilizers, engages an inner denticulation at the respective actuator connection. In order to construct such an outer denticulation at the stabilizer end, the latter initially must be compressed, in order to achieve a thickening of material. Only then can the denticulation be formed by appropriate metal-removing machining. Such a procedure is relatively costly and unsuitable for use in large-scale production.

The formation of such an axially extending denticulation for the non-rotational coupling of the stabilizer part to the actuator is also shown in the German Patent Document DE 44 43 809 A1 as well as in the German Patent Document DE 44 42 223 C2.

For the German Patent Document DE 43 37 771 A1, the non-rotational coupling of a stabilizer part with the actuator is achieved owing to the fact that, at the end of the stabilizer part that is to be connected with the actuator, a flattened insertion plate is formed, which is introduced into an appropriate accommodating slot in the respective actuator connection, clamping screws being provided, which pass through the insertion plate transversely to the plane of the plate and fasten it to the actuator connection. This embodiment is also relatively expensive for large-scale use.

The German Patent Document DE 43 37 813 A1 discloses the formation of a disk-shaped flange at the respective stabilizer end. This disk-shaped flange can then be connected with a ring-shaped welded seam at the rotor of the actuator. For connecting the stator, a disk-shaped flange, at which a fitting flange constructed at the respective end of the associated stabilizer part is fastened, is attached to the stator by means of a ring-shaped welded seam. The construction of such welded connections is also relatively expensive.

An object of the present invention is to provide embodiments of a stabilizer arrangement of the initially mentioned type, which are suitable for large-scale production.

Pursuant to the invention, this objective is accomplished by a stabilizer arrangement of the above noted general type, wherein at least one of the stabilizer parts is connected indirectly with the associated actuator connection over a coupling element, which is connected non-rotationally with the stabilizer part. The invention also achieves this objection by providing a method of making a stabilizer arrangement of this type, wherein the stabilizer part, which is connected with the associated coupling element by methods such as a friction welding method or the laser welding method, consists of a metal or metal alloy, which is different from that of the coupling element. This objective is also achieved by a method wherein at least one coupling element is produced separately from the associated stabilizer part and subsequently fastened non-rotationally at the associated stabilizer part and, thereupon, the component group, formed from the stabilizer part and the added-on coupling element, is connected with the actuator.

The special advantage of the inventive stabilizer arrangement can be seen therein that differently constructed, shaped or formed stabilizer parts can always be connected with the same coupling elements or the same actuator connections, so that, in this respect, the diversity of parts can be reduced. These measures facilitate, in particular, the logistics of large-scale production.

It is appreciably less expensive to manufacture suitable coupling elements, such as a flange or a profile pin, separately from appropriate blanks and to mount these at the end of the stabilizer part, for example, with the proposed friction welding method, than at the end of the stabilizer part, initially creating, by means of a compression method or the like, the prerequisites for forming a coupling element, integrally molded at the stabilizer part. Overall, manufacturing time and manufacturing costs can be saved by these means. This is particularly advantageous within the scope of large-scale production.

By connecting at least one stabilizer part to the associated actuator connection or to an associated coupling part with the help of self-welded connection, for example, with a friction welded connection or with a laser welded connection, a high-strength connecting technique, which can be used especially within the scope of a large-scale production, is proposed. For example, in the case of the friction welding or the laser welding method, pre-manufactured coupling elements can be connected non-rotationally to the respective stabilizer part without requiring, for example, a compression of the stabilizer part. The friction welded connection can also be formed relatively quickly. The undetachable self-welded, high-strength connection of the coupling element to the stabilizer part results in a one-part component group, which can be connected completely in the conventional manner with the actuator.

Embodiments are also contemplated where the respective stabilizer part can also be mounted directly on the actuator or on one of its connections, for example, by the friction welding method.

Compared to other welding methods, friction welding is distinguished, for example, by the fact that even highly alloyed steels can be joined crack-free without pre- or post-heating. In addition, parts, which have already been finished, can also be joined together by friction welding. Moreover, it is possible to connect different metals or metal alloys undetachably to one another by self-welding with a friction welding method. For example, a high-grade expensive spring steel can consequently be used for producing stabilizer parts, while the coupling part, integrally molded to it in one piece, consists of a less expensive steel.

In the scope of its production, the respective coupling element can be pre-manufactured to such an extent already, that further machining steps are not required for the subsequent connection to the actuator. For example, a flange can already be equipped with appropriate bolt boreholes. Likewise, an insertion part with an outer denticulation can already be provided with the axial teeth.

Pursuant to a particularly appropriate manufacturing method, the method for producing the self-welded connection, such as the friction welding, can be controlled so that, for ending the friction welding process, the rotation between the parts, which are to be welded to one another, is stopped, so that a predetermined relative position between the coupling element and the stabilizer part is formed, in order to obtain in this manner a desired relative position between the actuator and the stabilizer part, which is to be fastened to it later on. In this way, additional measuring processes can be omitted.

Further important distinguishing features and advantages of the inventive stabilizer arrangement as well as of the inventive method arise out of the dependent claims, from the drawings and from the associated description of the drawings.

It should be self to evident to one skilled in the art that the above-named distinguishing features and the distinguishing features still to be explained below can be used not only in the combinations given, but also in other combinations or by themselves alone, without leaving the scope of the present invention.

Preferred embodiments of the invention are shown in the drawings and are described in greater detail in the following specification.

Other objects, advantages and novel features of the present invention will become apparent from the following detailed description of the invention when considered in conjunction with the accompanying drawings.

DETAILED DESCRIPTION OF THE DRAWINGS

Figure 1:
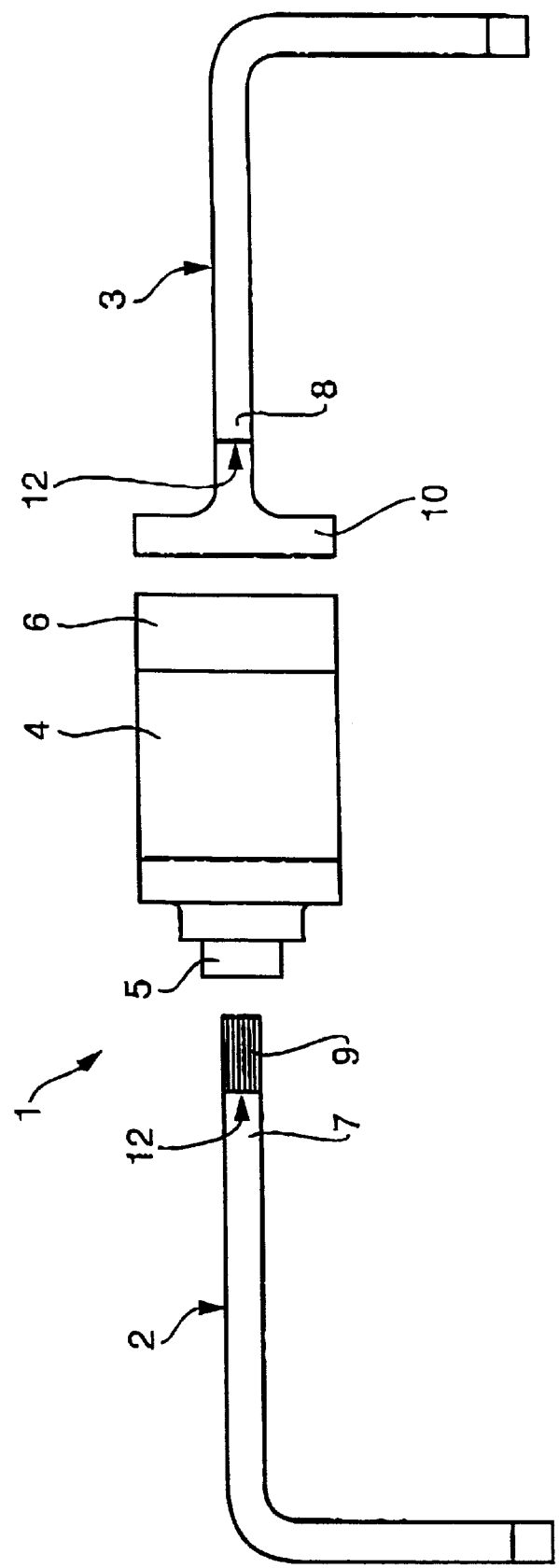
FIG. 1 is a schematic exploded view which shows a view of a stabilizer arrangement according to a preferred embodiment of the present invention, showing two stabilizer parts not yet being connected with an associated actuator.
Figure 2:
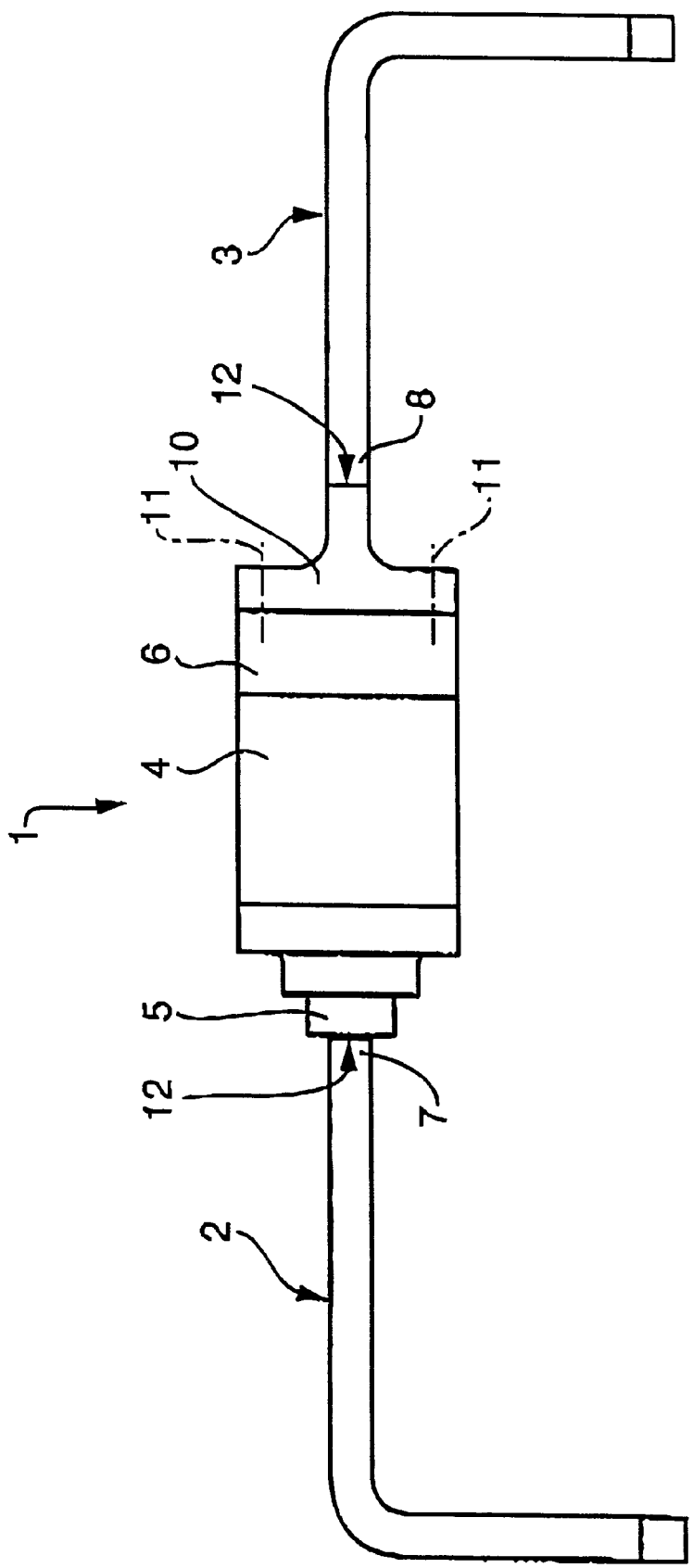
FIG. 2 is a schematic view of the stabilizer arrangement of FIG. 1, showing the stabilizer parts being connected with the actuator.
Figure 3:
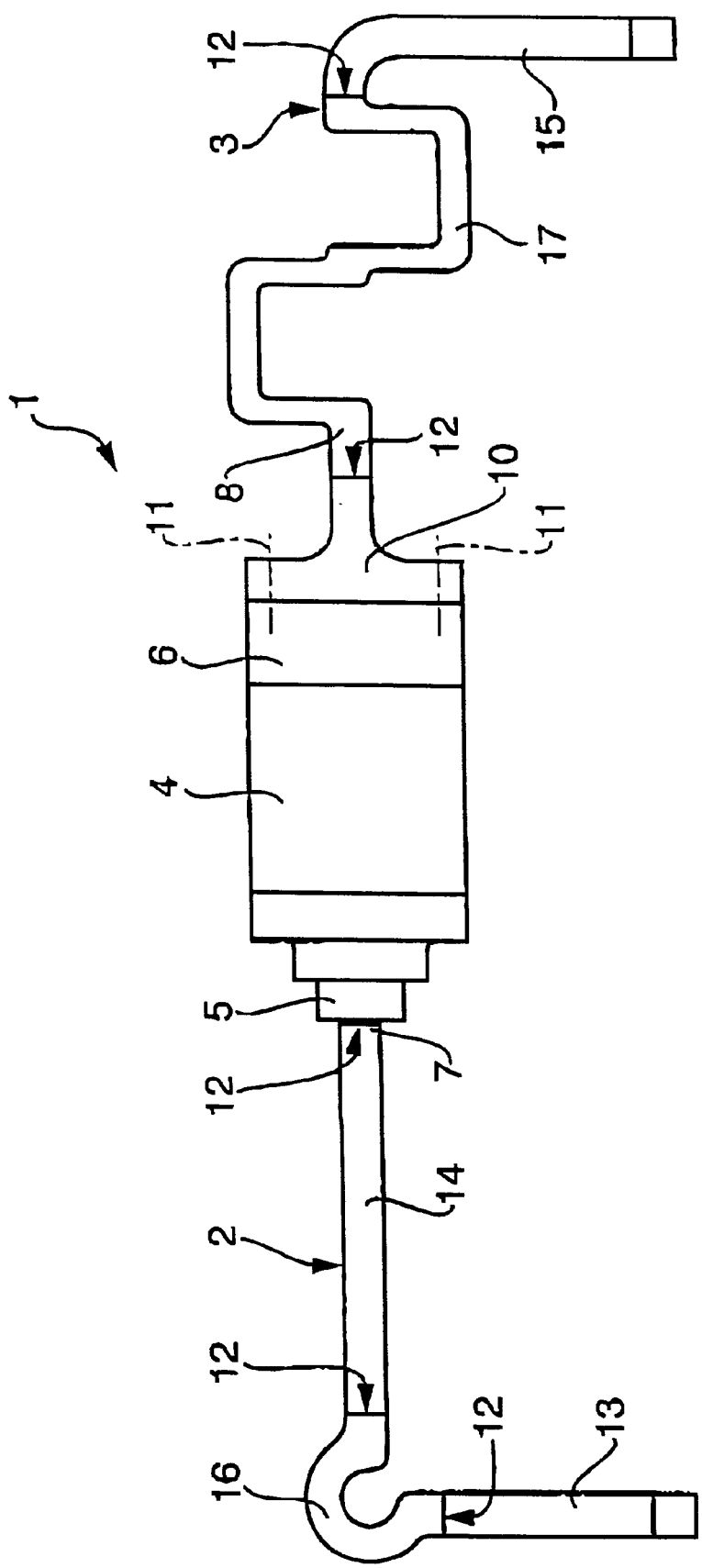
FIG. 3 is a view, similar to that of FIG. 2, however of a different embodiment with stabilizer parts of complicated shape.

Corresponding to FIGS. 1 to 3, an inventive stabilizer arrangement 1 includes a first stabilizer part 2, which is assigned to a wheel, which is not shown, of a motor vehicle, which is also not shown. In addition, the stabilizer arrangement 1 has a second stabilizer part 3, which belongs to a different wheel of the same vehicle axle line and is also not shown. Moreover, the stabilizer arrangement 1 comprises an actuator 4, which preferably is constructed as a rotor-stator aggregate. For the non-rotational attachment of the stabilizer parts 2 and 3 to the actuator connections, namely a first actuator connection 5 and a second actuator connection 6, the ends 7 and 8 of the stabilizer parts 2 and 3, facing the actuator 4, are in each case provided with a coupling element, namely a first coupling element 9 and a second coupling element 10.

Whereas the first coupling element 9 is constructed in the form of a plug-in part, equipped with an outer axial denticulation, the second coupling element 10 is formed by a flange, particularly by a disk-shaped flange. For example, the flange-shaped second coupling element 10 is mounted non-rotationally by an appropriate bolted connection with the second actuator connection 6, which, for example, is a rotor component. The bolted connection is indicated in FIGS. 2 and 3 by broken lines 11. In distinction from this, the first coupling element 9, constructed as a plug-in part, is fixed non-rotationally to the first actuator connection 5 owing to the fact that this coupling element 9 is inserted axially into the actuator connection 5, the first actuator connection 5 having a corresponding inner denticulation. The first actuator connection 5 then is, for example, a component of the stator.

The attachment of the coupling elements 9 and 10 to the respective stabilizer parts 2 and 3 takes place in the present example by a friction welded connection 12, which is shown by a line in FIGS. 1 to 3, which symbolizes the friction weld bead formed during the friction welding process.

Alternatively, the coupling element 9, 10 can also be connected by any other self-welding connection, such as a laser welding method, with the associated stabilizer part 2, 3. Depending on the material combination, a soldered connection, a glued connection or a clamped connection can also be used.

For the examples shown, the stabilizer parts 2 and 3 are connected in each case indirectly over the associated coupling element 9, 10 non-rotationally with the actuator 4. On the other hand, in the case of a different embodiment, it may be entirely appropriate to connect at least one of the stabilizer parts 2 or 3 directly with the respective connection 5 or 6 of the actuator 4, in which case the frictional welded connection 12 is then formed in an appropriate manner between the stabilizer part 2, 3 in question and the associated actuator connection 5, 6.

According to FIG. 3, it may be necessary, for special embodiments of the stabilizer arrangement 1, to construct relatively complicated and, especially, three-dimensional shapes for the stabilizer parts 2 and 3. From a manufacturing point of view, it may be of advantage if the stabilizer part 2 or 3 in question, as in the case of the example in FIG. 3, can be divided into simply shaped sections 13, 14 and/or 15 and complicated sections 16 and/or 17, to produce these sections 13, 14, 15, 16, 17 separately and to assemble them subsequently, this here being realized advantageously once again by means of a friction welded connection 12.

Figure 4:
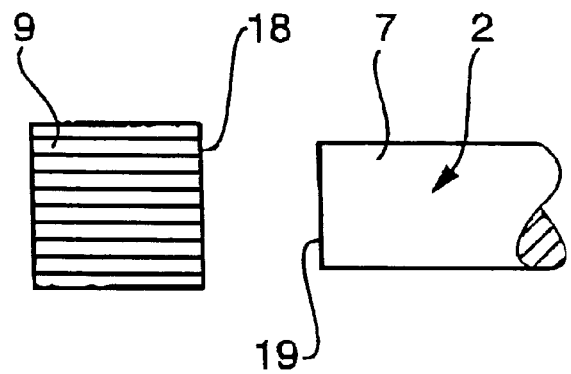
FIG. 4 is a side exploded view of a coupling elements according to preferred embodiments of the invention, constructed as a plug-in part with an outer denticulation.

In accordance with FIG. 4, a coupling element 9 constructed as a profile pin or insertion part may have a standardized size, which has a construction, optimized for the connection with the actuator 4. For attaching the respective stabilizer part, in this case, stabilizer part 2, mutual parallel front surfaces 18 and 19 of the stabilizer part end 7 and the coupling element 9 are aligned coaxially and connected to one another by the friction welding method. The external diameter of the stabilizer part 2, which is to be connected, may have a large number of different values, so that, for a large number of stabilizer arrangements 1 of different construction, the identical coupling elements 9 can be used.

Figure 5:
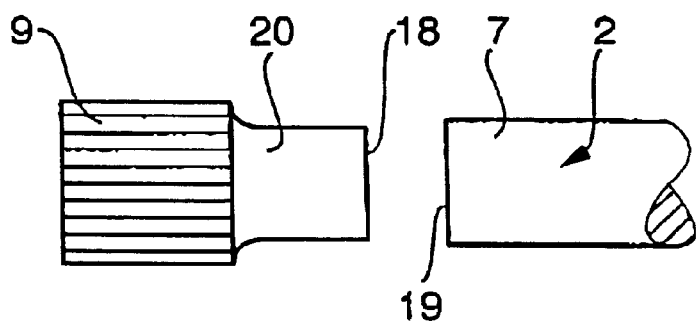
FIG. 5 is a view similar to that of FIG. 4 showing another embodiment, with the plug-in part, however, being equipped with a shoulder.

For an improved transfer of force and moment, the coupling element 9, constructed as an insertion part according to FIG. 5, can also be equipped with a shoulder 20 which, in the region of the front surfaces 18 and 19, has an external diameter approximated to the stabilizer part 2.

Figure 6:
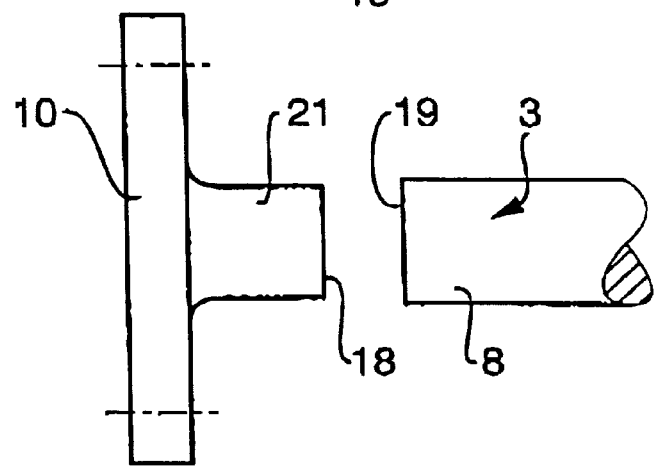
FIG. 6 is a side view of a coupling element showing another embodiment, constructed as a flange, with a shoulder

Likewise, as shown in FIG. 6, a coupling element 10, constructed as a flange, can be equipped with such a shoulder 21, which enables forces and moments to be transferred with reduced force or moment peaks.

Figure 7:
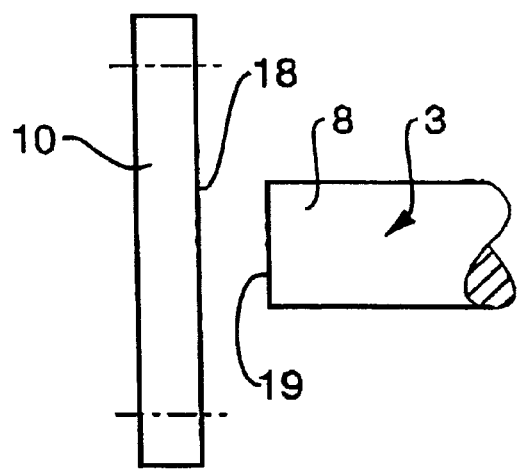
FIG. 7 is a view, similar to that of FIG. 6 showing another embodiment, with the flange being formed without a shoulder.

Likewise, as shown in FIG. 7, it is possible to equip the flange-shaped coupling element 10 without such a shoulder 21, so that here also once again almost any external diameter for the stabilizer part in question, in this case stabilizer part 3, can be friction welded to the flange-shaped coupling element 10.

The stabilizer arrangement 1 can be produced, pursuant to the invention, as follows:

The stabilizer parts 2 and 3 and the actuator 4 as well as the coupling elements 9 and 10 are in each case produced separately. According to a first alternative, the coupling elements 9 and 10 can be finished completely or, according to a second alternative, they can be constructed without the respective fastening means, such as the denticulation or the boreholes for the bolted connection.

Before the stabilizer parts 2 and 3 are fastened to the actuator 4, the coupling elements 9 and 10 are mounted self-welded to the respective stabilizer part 2 or 3 by a friction welding method. If the respective fastening means, mentioned above, are not yet formed at the coupling elements 9 and 10, they are mounted in a subsequent processing step. In so doing, the desired relative position of the actuator 4 to the stabilizer parts 2 and 3, subsequently attached to the actuator 4, must also be taken into consideration. For the already completed coupling elements 9 and 10, that is, for coupling elements 9 and 10 already equipped with the respective fastening means, the friction welding method preferably is carried out so that the components, rotating relative to one another during the friction welding, are held or stopped in such a manner that a certain relative position results between the stabilizer part 2 or 3 and the associated coupling element 9 or 10. This relative position correlates with that which is desired for connecting the stabilizer part 2 or 3 to the actuator 4.

It is clear that the attachment of the stabilizer parts 2 or 3 can also be carried out directly at the connections 5 or 6 of the actuator 4, in which case the friction welding process is then carried out in an appropriately adapted manner.

A welding bead, formed during the friction welding process, can be removed at the conclusion of this process by means of a die.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A stabilizer arrangement for a passenger car for coupling two wheels of a vehicle axle line, comprising:
   a first stabilizer part assigned to one wheel,
   a second stabilizer part assigned to the other wheel, and
   an actuator which couples the stabilizer parts and makes possible a pretension of the stabilizer parts, the first stabilizer part being connected non-rotationally with a first actuator connection and the second stabilizer part being connected non-rotationally with a second actuator connection,
   wherein at least one of the stabilizer parts is connected indirectly with the associated actuator connection over a coupling element which is connected non-rotationally with the stabilizer part by a self-welded connection comprising one of a friction welded connection and a laser welded connection, the at least one stabilizer part being made from a metal or a metal alloy which is different from a material of the coupling element.

2. The stabilizer arrangement of claim 1, wherein at least one of the stabilizer parts includes at least two sections, which are connected with one another by respective self-welded connections.

3. The stabilizer arrangement of claim 1, wherein the coupling element which is connected with the respective stabilizer part by means of a self-welded connection is constructed as a flange with boreholes for bolting or as an insertion part with a profiled outer contour, such as an outer denticulation, suitable for transferring moments.

4. The stabilizer arrangement of claim 2, wherein the coupling element which is connected with the respective stabilizer part by means of a self-welded connection is constructed as a flange with boreholes for bolting or as an insertion part with a profiled outer contour, such as an outer denticulation, suitable for transferring moments.

5. The stabilizer arrangement of claim 1, wherein the coupling element has a shoulder at which the self-welded connection is formed with the stabilizer part and which, at an end facing the stabilizer part, has the same external diameter as the stabilizer part.

6. The stabilizer arrangement of claim 5, wherein the coupling element which is connected with the respective stabilizer part by means of a self-welded connection is constructed as a flange with boreholes for bolting or as an insertion part with a profiled outer contour, such as an outer denticulation, suitable for transferring moments.

7. A method for producing a stabilizer arrangement for coupling two wheels of a vehicle axle line of a passenger car, comprising:
   a first stabilizer part assigned to one wheel,
   a second stabilizer part assigned to the other wheel, and
   an actuator which couples the stabilizer parts and makes possible a pretension of the stabilizer parts, the first stabilizer part being connected non-rotationally with a first actuator connection and the second stabilizer part being connected non-rotationally with a second actuator connection, said method comprising:

connecting the first and the second stabilizer part non-rotationally with the actuator, wherein at least one coupling element is produced separately from an associated stabilizer part and subsequently fastened non-rotationally to the associated stabilizer part by a self-welded connection comprising one of a friction welded connection and a laser welded connection and, thereupon, the component group, formed from the stabilizer part and the added-on coupling element, is connected with the actuator, wherein the self-welded connection is controlled so that a predetermined relative position is brought about between the associated stabilizer part and the therewith connected coupling element, and wherein the associated stabilizer part is made from a metal or a metal alloy which is different from a material of the therewith connected coupling element.

8. The method of claim 7, wherein a friction welding bead, formed by a friction welding method, is removed.

9. The method of claim 7, wherein, after the self-welded connection comprising one of the friction welded connection and the laser welded connection, is formed, a finishing process is carried out at least for one section of the component group, containing the self-welded connection and formed by the stabilizer part and the added-on coupling element.

10. A stabilizer arrangement system for a passenger car for coupling two wheel assemblies of a vehicle axle line comprising:

a first stabilizer part connectable to one wheel assembly;

a second stabilizer part connectable to the other wheel assembly;

a first and a second standard coupling element each being produced separately from the first and the second stabilizer parts and each having respectively oppositely facing ends; and a standard actuator operatively arranged with first and second standard actuator connections, the standard actuator being capable of pretensioning the first and the second stabilizer parts when in an assembled condition;

wherein one end of each of the first and the second standard coupling elements is non-rotationally connectable with respective ones of the first and second stabilizer parts to form first and second component groups;

wherein at least one of the first and second stabilizer parts is made from a metal or a metal alloy which is different from a material of a respective one of the first and second standard coupling elements, and wherein an opposite end of each of the coupling elements is non-rotationally connectable with a respective end of the standard actuator, whereby standard coupling elements and actuators can be used to manufacture different vehicle stabilizer arrangements with differently configured stabilizer parts.

11. The stabilizer arrangement system of claim 10, wherein the first and second standard coupling elements are connected with respective ones of the first and second stabilizer parts by one of a friction welded connection and a laser welded connection.

* * * * *